H. LANE.
GAS PURIFYING PLANT.
APPLICATION FILED JULY 16, 1910.
1,025,918.
Patented May 7, 1912.
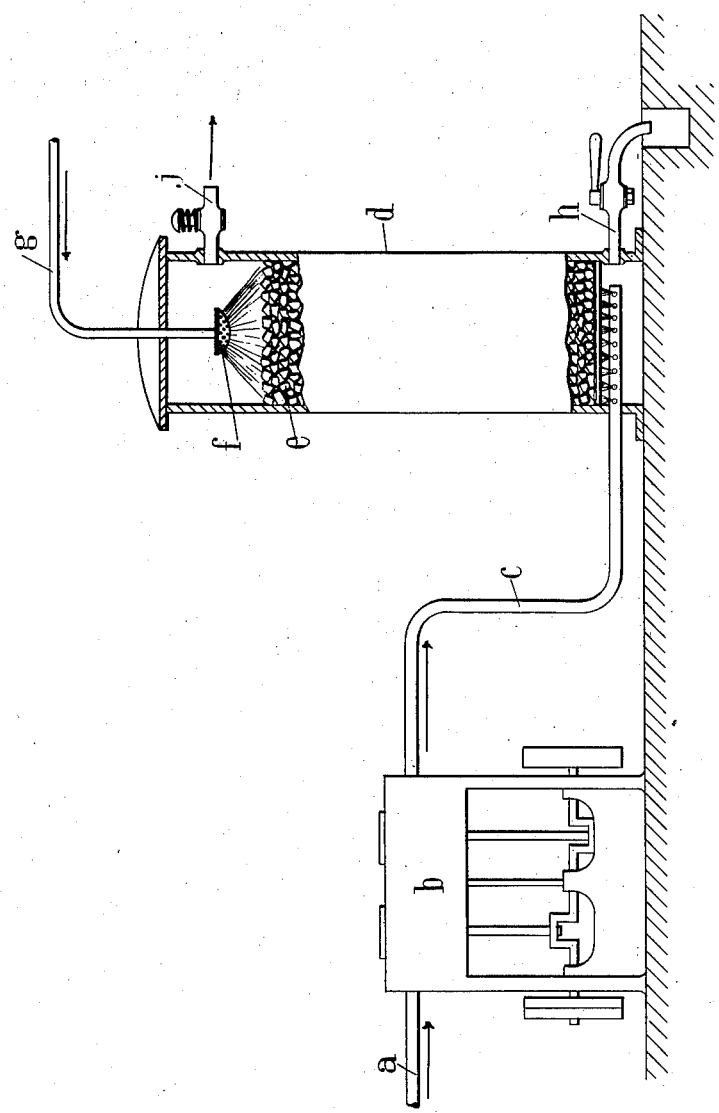
WITNESSES:
INVENTOR
HOWARD LANE
BY
ATTORNEYS

UNITED STATES PATENT OFFICE.

HOWARD LANE, OF BIRMINGHAM, ENGLAND, ASSIGNOR TO INTERNATIONALE WASSERSTOFF AKTIENGESELLSCHAFT, OF FRANKFORT-ON-THE-MAIN, GERMANY.

GAS-PURIFYING PLANT.

1,025,918.

Specification of Letters Patent.

Patented May 7, 1912.

Application filed July 16, 1910. Serial No. 572,410.

*To all whom it may concern:*

Be it known that I, HOWARD LANE, a subject of the King of Great Britain, and resident of 125 Edmund street, Birmingham, in the county of Warwick, England, have invented certain new and useful Improvements in Gas-Purifying Plants, of which the following is a specification.

This invention relates to the purification of gases and more particularly to the purification of crude gases such as water gas, coal gas and other gases generated from carbonaceous fuel employed as reducing agents in the process of producing hydrogen by the alternate oxidation and deoxidation of a metal. When this process of manufacturing hydrogen is worked on a commercial scale it has been found that the efficiency of the contact material in the reducing retorts tends to gradually decrease until the process becomes almost inoperative owing to the deposition of sulfur on the surface of the contact material and the presence of sulfur and other impurities *e. g.* sulfurous acid, sulfureted hydrogen, carbon dioxid, moisture and the like. Hence it is found necessary in practice to employ a greater amount of reducing gas than that theoretically necessary to carry out the reduction, thus considerably increasing the working cost.

The object of the present invention is to provide means for purifying the gas more completely than has heretofore been usual, the invention consisting in the employment of a pump adapted to compress the impure gas to a pressure of several atmospheres and deliver it to a washing tower containing coke or other neutral material through which a finely divided stream of water flows in the direction opposite to that of the stream of gas.

The invention will be described with reference to the accompanying drawing which shows an elevation partly in section of the gas purifying apparatus constructed in accordance with this invention.

$a$ is a pipe connecting the gas supply to the power driven pump $b$ whose outlet is connected to a pipe $c$ conducting the gas under a pressure of several atmospheres to the lower part of the washer $d$. The extremity of the pipe $c$ within the washer is provided with a plurality of holes or nozzles for subdividing the stream of ascending gas. The washer $d$ is partially filled with coke or other neutral material $e$ and is provided with a spraying device $f$ which is connected by a pipe $g$ to a water supply under pressure and serves to subdivide the descending stream of water which is withdrawn from the lower part of the washer through a pipe $h$.

$j$ is a relief valve disposed at the upper extremity of the washer and connected to a gas receiver in the usual manner, said valve serving to maintain the necessary pressure within the washer.

In operation the gas, at a low pressure, is drawn into the pump $b$ through the pipe $a$ and is then forced through the pipe $c$ and delivered to the lower part of the washer in which it ascends through the neutral material and in contact with the descending stream of water, the chemical impurities (*e. g.* sulfurous acid, sulfureted hydrogen, carbon dioxid) contained in the gas either becoming condensed or dissolved in the water and the purified gas passing away through the relief valve $j$ to a gas receiver (not shown). The water descending through the inert material becomes saturated with impurities and is withdrawn from the base of the washer through the pipe $h$.

Claim:

In apparatus for purifying crude gas, the combination of a closed fluid-tight vessel, means for introducing crude gas under pressure into said vessel, means for introducing water under pressure into said vessel, means for causing a thorough intermingling of gas and water, an outlet conduit and a relief valve in said conduit adapted to operate to allow the escape of purified gas through said conduit when the pressure in said vessel exceeds a certain predetermined amount.

HOWARD LANE.

Witnesses:
NORMAN S. BARLOW,
FRANK V. NEALE.